US012785440B2

(12) United States Patent
Berning

(10) Patent No.: US 12,785,440 B2
(45) Date of Patent: Nov. 3, 2026

(54) ELECTRICAL DEVICE WITH AUTOMATIC POWER TRANSFER CAPABILITY

(71) Applicant: instagrid GmbH, Ludwigsburg (DE)

(72) Inventor: Sebastian Berning, Stuttgart (DE)

(73) Assignee: instagrid GmbH, Ludwigsburg (DE)

( * ) Notice: Subject to any disclaimer, the term of this patent is extended or adjusted under 35 U.S.C. 154(b) by 0 days.

(21) Appl. No.: 19/428,984

(22) Filed: Dec. 22, 2025

(65) Prior Publication Data

US 2026/0142494 A1 May 21, 2026

Related U.S. Application Data

(63) Continuation of application No. PCT/EP2025/052147, filed on Jan. 28, 2025.

(30) Foreign Application Priority Data

Feb. 27, 2024 (GR) .............................. 20240100139
Mar. 28, 2024 (EP) .............................. 24020099
Mar. 30, 2024 (EP) .............................. 24020100

(51) Int. Cl.
*H02J 9/06* (2006.01)
*H02J 3/007* (2026.01)

(52) U.S. Cl.
CPC .............. *H02J 9/068* (2020.01); *H02J 3/007* (2020.01)

(58) Field of Classification Search
CPC ........................................ H02J 9/068
See application file for complete search history.

(56) References Cited

U.S. PATENT DOCUMENTS 3,573,483 A 4/1971 White
4,492,876 A 1/1985 Colbert et al.
(Continued)

FOREIGN PATENT DOCUMENTS

CN 113793782 A 12/2021
DE 102007029271 A1 12/2008
(Continued)

OTHER PUBLICATIONS

Tian et al., “400 V/1000 kVA Hybrid Automatic Transfer Switch”, IEEE Transactions on Industrial Electronics, Dec. 2013, pp. 5422-5435, vol. 60, No. 12.

*Primary Examiner* — Menatoallah Youssef
*Assistant Examiner* — Michael J Warmflash
(74) *Attorney, Agent, or Firm* — The Webb Law Firm

(57) ABSTRACT

The present teachings relate to an electrical device comprising: a first electrical power input connectable to receive electrical power from a first power source; a second electrical power input connectable to receive electrical power from a second power source different from the first power source; at least one electrical power output, each electrical power output being connectable to supply electrical power to an individual electrical power consumer; a switching circuit operable to route electrical power from the first electrical input to at least one of the electrical power outputs; a sense circuit operable to detect a depletion signal indicating an interruption in the electrical power which is being provided at the first electrical input; a controller operable to control the switching circuit to switch from the first electrical power input to the second electrical power input in response to the depletion signal, thereby routing electrical power from the second electrical input to at least one of the electrical power outputs. Related methods and software products are also disclosed.

22 Claims, 4 Drawing Sheets

(56) References Cited

U.S. PATENT DOCUMENTS

| | | | | | |
|---|---|---|---|---|---|
| 6,130,813 | A * | 10/2000 | Kates | H02J 1/10 | 361/93.1 |
| 6,465,911 | B1 * | 10/2002 | Takeda | H02J 9/062 | 307/115 |
| 6,611,416 | B1 | 8/2003 | Cleereman et al. | | |
| 6,630,752 | B2 | 10/2003 | Fleming et al. | | |
| 6,757,589 | B1 * | 6/2004 | Parker | F16K 37/0075 | 700/282 |
| 7,265,458 | B2 | 9/2007 | Edelen et al. | | |
| 7,535,123 | B2 | 5/2009 | Formenti et al. | | |
| 7,535,129 | B2 | 5/2009 | Phelps et al. | | |
| 7,709,975 | B2 | 5/2010 | Kuo | | |
| 7,723,870 | B2 | 5/2010 | Hou | | |
| 8,004,115 | B2 | 8/2011 | Chapel et al. | | |
| 8,076,798 | B2 | 12/2011 | Mehler et al. | | |
| 8,866,339 | B2 | 10/2014 | Huang | | |
| 8,899,870 | B1 | 12/2014 | Hall | | |
| 9,627,924 | B2 * | 4/2017 | Larson | H02J 9/06 | |
| 9,634,601 | B2 | 4/2017 | Kessler et al. | | |
| 9,735,617 | B2 * | 8/2017 | Pope | H05B 45/10 | |
| 9,871,460 | B2 * | 1/2018 | Kuranuki | H02M 5/42 | |
| 9,899,869 | B1 | 2/2018 | McCracken et al. | | |
| 9,935,495 | B2 * | 4/2018 | Thurk | H02J 9/06 | |
| 9,966,793 | B2 | 5/2018 | Batra et al. | | |
| 9,997,957 | B2 * | 6/2018 | Chapel | H02J 9/061 | |
| 10,049,830 | B2 | 8/2018 | Pham et al. | | |
| 10,097,010 | B2 | 10/2018 | Barrenscheen et al. | | |
| 10,469,085 | B2 | 11/2019 | Rosca et al. | | |
| 10,511,186 | B1 * | 12/2019 | Mische | H02J 9/061 | |
| 10,861,663 | B2 * | 12/2020 | Saito | H01H 47/002 | |
| 11,043,837 | B2 | 6/2021 | Liu | | |
| 11,072,257 | B2 | 7/2021 | Lee et al. | | |
| 11,664,677 | B2 | 5/2023 | Pachoud et al. | | |
| 11,699,919 | B2 | 7/2023 | Pachoud et al. | | |
| 11,726,537 | B2 * | 8/2023 | Kanjirathinkal | G06F 1/263 | 713/340 |
| 11,837,909 | B2 * | 12/2023 | Huang | H02J 3/007 | |
| 11,929,582 | B2 | 3/2024 | Pachoud et al. | | |
| 11,929,614 | B2 | 3/2024 | Cao et al. | | |
| 2002/0180400 | A1 * | 12/2002 | George | B66D 3/18 | 318/727 |
| 2003/0048004 | A1 * | 3/2003 | Fleming | H02J 9/06 | 307/64 |
| 2005/0122650 | A1 * | 6/2005 | Beasley, III | H02H 11/001 | 361/90 |
| 2005/0125172 | A1 * | 6/2005 | Patino | G06F 1/26 | 702/63 |
| 2011/0068625 | A1 * | 3/2011 | Duan | G06F 11/2015 | 307/29 |
| 2012/0068541 | A1 * | 3/2012 | Anderson | H02J 9/061 | 307/66 |
| 2015/0145476 | A1 * | 5/2015 | Toya | H02J 7/70 | 320/109 |
| 2015/0180275 | A1 * | 6/2015 | Tomassi | H02J 9/061 | 307/64 |
| 2017/0244274 | A1 * | 8/2017 | Ewing | H02J 9/06 | |
| 2017/0255242 | A1 * | 9/2017 | Halpern | H02J 1/10 | |
| 2017/0310159 | A1 * | 10/2017 | Batra | H03K 17/687 | |
| 2017/0366040 | A1 * | 12/2017 | Gould | H01H 47/00 | |
| 2020/0014239 | A1 * | 1/2020 | Liu | H02J 1/10 | |
| 2020/0358309 | A1 * | 11/2020 | Ferguson | H02J 3/0073 | |
| 2020/0403440 | A1 * | 12/2020 | Sarder | H02J 3/007 | |
| 2021/0083482 | A1 * | 3/2021 | Taimela | H02J 3/381 | |
| 2021/0313827 | A1 * | 10/2021 | Pachoud | G06F 1/263 | |
| 2021/0328454 | A1 * | 10/2021 | Lee | H02J 9/062 | |
| 2021/0351609 | A1 * | 11/2021 | Chen | H02J 1/084 | |
| 2022/0021234 | A1 * | 1/2022 | Northway | H02J 3/14 | |
| 2022/0037915 | A1 * | 2/2022 | Pachoud | H01H 47/002 | |
| 2022/0069603 | A1 * | 3/2022 | Williams | H02J 7/731 | |
| 2022/0109324 | A1 * | 4/2022 | Yang | H02J 9/061 | |
| 2023/0009206 | A1 | 1/2023 | Fujimatsu et al. | | |
| 2024/0171062 | A1 | 5/2024 | Dent | | |
| 2024/0186821 | A1 | 6/2024 | Pachoud et al. | | |
| 2026/0112917 | A1 * | 4/2026 | Fiedler | H02J 3/007 | |

FOREIGN PATENT DOCUMENTS

| | | | | |
|---|---|---|---|---|
| EP | 2327132 B1 | 12/2018 | | |
| EP | 3591782 A2 | 1/2020 | | |
| EP | 3852230 A1 | 7/2021 | | |
| EP | 4329147 A1 | 2/2024 | | |
| JP | S6190403 A | 5/1986 | | |
| JP | H10255627 A | 9/1998 | | |
| TW | 201108292 A | 3/2011 | | |
| WO | WO-2014070858 A2 * | 5/2014 | | H02J 4/25 |
| WO | 2019204138 A1 | 10/2019 | | |

* cited by examiner

ELECTRICAL DEVICE WITH AUTOMATIC POWER TRANSFER CAPABILITY

CROSS REFERENCE TO RELATED APPLICATIONS

This application is a Bypass Continuation of International Application No. PCT/EP2025/052147, filed Jan. 28, 2025, and claims priority from European Patent Application No. 24020099.8, filed Mar. 28, 2024, European Patent Application No. 24020100.4, filed Mar. 30, 2024, and Greek Patent Application No. 20240100139, filed Feb. 27, 2024, the disclosures of which are hereby incorporated by reference in their entireties.

BACKGROUND

Technical Field

The present disclosure relates to an electrical device, e.g., an automatic transfer switch or a power distributor, particularly stand-alone portable ones, related methods and software products.

Technical Considerations

Portable power supplies are suitable for providing electrical power at various locations such as construction sites where permanent power has not been established. They may be critical for powering tools, lighting, equipment, and other temporary installations.

Portable power supplies (e.g., for use at construction sites) are mobile electrical systems designed to temporarily provide electric power to electrical consumers such as tools, machinery, and lighting systems where permanent power is not yet or not reliably available. It is desirable that such systems are rugged and self-contained such that they can be easily transported and positioned around different parts of the site. Alternative solution may be fuel-powered generators however, fuel-powered generators can have some drawbacks such as: various kinds of emissions caused by combustion of fuel in fuel-powered generators. Fuel-powered generators emit noise, carbon dioxide and other environmentally detrimental pollutants which can cause concern for both environmental impact and the health of the workers on-site.

Furthermore, in some areas, there may be restrictions on the use of fuel-powered generators due to noise ordinances or emission regulations. Moreover, certain sites such as enclosed spaces may not be suitable to be powered by combustion engine based generators.

For portability and ease of use by a single user, the total weight of a portable power supply is desirable to be kept low. This however typically sets a limit to the capacity of these devices. Sometimes, multiple power supplies or sources may be provided at sites to have enough energy capacity, or as backup power. There can thus be cases where there is a demand for higher capacity, while maintaining portability.

SUMMARY

At least some of the problems mentioned above will be shown solved by the subject matter of the herein included independent claims. The dependent claims and aspects in the specification show certain other advantageous improvements.

When viewed from a first perspective, there can be provided an electrical device, e.g., embodied as an automatic electrical power transfer switch or an electrical power distributor, which allows multiple electrical power sources to be, each individually, connected at a respective electrical power input of the device, to be automatically selectably connected to at least one electrical power output, or a plurality of electrical power outputs, thereby powering any electrical power consumers (e.g., electrical loads) connected at those one or more electrical power outputs to be powered from the selected electrical power source. In some non-limiting embodiments, the electrical device may comprise a plurality of electrical power outputs.

It can be particularly desirable that the electrical device is separate from the electrical power sources. By "separate" it is meant that the electrical device is a self-contained unit (e.g., being enclosed in a housing which is physically separated and external from the any of the electrical power sources and electrical power consumers). In other words, it can be said that the electrical device does not comprise any electrical battery which is able to supply energy stored thereon at any of the electrical power outputs (e.g., to any electrical power consumers connected at the electrical power outputs). Thus, each of the electrical power sources are external and separatably connectable to the electrical device via one of the electrical power inputs. Similarly, each of the electrical power consumers are external and separatably connectable via any of the electrical power outputs.

Accordingly, the electrical device is preferably separatably electrically connectable to any of the electrical power sources and electrical power consumers. For example, separatable electrical connection can be established via an electrical cable or similar electrical medium connectable by a common user without requiring any specialized qualifications to perform electrical installations. A separatable electrical connection at input can be achieved, e.g., by connecting an electrical power source at an input port of the electrical device via an electrical cable (e.g., a standard power cable). Similarly, separatable electrical connection at output can be achieved, e.g., by connecting an electrical power consumer at an output port of the electrical device via an electrical cable (e.g., a standard power cable). It shall be appreciated that an input port may be realized e.g., as an electrical socket of standard or non-standard type. Similarly, an output port may be realized e.g., as an electrical socket of standard or non-standard type. An input port may be similar to an output port, e.g., same type of electrical sockets, or they may be of different types. More generally, input ports and/or output ports may all be of same type, or some or all may be of different types. An advantage of doing so is that the electrical device can be made independent of the type of electrical power source and consumer, thus providing flexibility in choosing and hooking-up various kinds of sources and consumers, as desired by the user, to the electrical device. For example, the kind of power source which should be used for powering a specific kind of consumer. The electrical device can even enhance the reliability of operation by ensuring a continuous power supply, as the device can receive and automatically route power from two or more distinct sources.

Additionally, or alternatively, some or all of the more than one electrical power outputs may be individually switchable (e.g., ON/OFF). Accordingly, the electrical device may be operable to provide a controllable power distribution means to allocate power to different electrical power outputs dependent on pre-determined criteria and/or monitored parameters. For example, due to certain limitations at one or more of the power sources and/or one or more electrical power inputs, the electrical device may prioritize powering certain outputs, e.g., by switching OFF some or all of the other outputs.

In this disclosure, the terms "electrical device", "power transfer switch" and "electrical power distributor" may be used interchangeably without affecting the scope or generality of the present teachings. It can also be contemplated that the power transfer switch is a part of an electrical device or unit which performs power distribution. However, in particularly desirable form, irrespective of the term in use, the device is connectable/separatable from the electrical power sources and from the electrical power consumers by a common user.

Thus, there can be provided an electrical device comprising:

- a first electrical power input connectable to receive electrical power from a first power source;
- a second electrical power input connectable to receive electrical power from a second power source different from the first power source;
- at least one electrical power output, each electrical power output being connectable to supply electrical power to an individual electrical power consumer;
- a switching circuit operable to route electrical power from the first electrical input to at least one of the electrical power outputs;
- a sense circuit operable to detect a depletion signal indicating an interruption in the electrical power which is being provided at the first electrical input;
- a controller operable to control the switching circuit to switch from the first electrical power input to the second electrical power input in response to the depletion signal, thereby routing electrical power from the second electrical input to any one or more of the electrical outputs (or at least one of the electrical power outputs).

It shall be appreciated that, in other words, there can also be provided, a portable electrical device comprising:

- a first electrical power input separably connectable to receive electrical power from a first power source;
- a second electrical power input separably connectable to receive electrical power from a second power source different from the first power source;
- at least one electrical power output, each electrical power output being separably connectable to supply electrical power to an individual electrical power consumer;
- a switching circuit operable in a first mode to route electrical power from the first electrical input to at least one of the electrical power outputs; wherein in the first mode, power from the second power source is prevented from being delivered to the electrical power outputs,
- a sense circuit operable to detect a depletion signal indicating an interruption in the electrical power which is being provided at the first electrical input;
- a controller operable to control the switching circuit, in a second mode, to switch from the first electrical power input to the second electrical power input in response to the depletion signal, thereby routing electrical power from the second electrical input to at least one of the electrical power outputs.

In the second mode power from the first power source is prevented from being delivered to the electrical power outputs.

It shall be appreciated that "first mode" of the electrical device is that in which electrical power at the first electrical power input (e.g., from the first power source) is exclusively used for powering all electrical power outputs of the electrical device, which power outputs are activated at that time. Similarly, it can be said that in the first mode, all other inputs, except the first input, are electrically disconnected (e.g., isolated) from the electrical outputs of the device.

It shall be appreciated that "second mode" of the electrical device is that in which electrical power at the second electrical power input (e.g., from the second power source) is exclusively used for powering all electrical power outputs of the electrical device, which power outputs are activated at that time. Similarly, it can be said that in the second mode, all other inputs, except the second input, are electrically disconnected (e.g., isolated) from the electrical outputs of the device.

It shall be appreciated that in a preferable form, the electrical power inputs are separatably connectable to the respective power sources. Similarly, the at least one electrical power output (e.g., all outputs) is separatably connectable to the respective electrical power consumer by a common user. It shall be appreciated that by being "separatably connectable by a common user" it is meant that the power inputs and power outputs are easily connectable and detachable from the respective power sources and consumers, e.g., without requiring special tools and/or the user being qualified to do so. For example, the user required to being a qualified specialist such as an electrician for connecting or disconnecting the sources or consumers at the electrical device (via power inputs/outputs) would not be considered to be "separatably connectable by a common user". For example, a power input being connectable to an electrical power source via an electrical cable having plug/socket arrangement for establishing the connection between said source and power input would qualify as being "separatably connectable by a common user". Similarly, a power output being connectable to an electrical power consumer via an electrical cable having plug/socket arrangement for establishing the connection between said source and power input would qualify as being "separatably connectable by a common user". The plug/socket arrangement may be any type of AC power plugs and sockets or DC power plugs and sockets. As non-limiting examples, any standards such as CEE, BS, NEMA, or non-standard versions may be used as connectable electrical power inputs and/or electrical power outputs of the electrical power unit. Thus, the inputs and outputs can be separatably connectable via receptacles (e.g., electrical sockets of standard and/or custom type) of same of different types. For example, the receptables may be arranged at the housing of the electrical device. The user may be able to flexibly connect various kinds of power sources and electrical consumers at the respective receptacles without requiring specialization in handling electrical installations. The user may do so by connecting corresponding plug (e.g., electrically connected to a power source or an electrical consumer) at the respective receptacle. In this or other aspects, the electrical device may be water and/or dust resistant. This can allow the device being especially usable in outdoor conditions and in applications such as construction sites where exposure to dust and moisture may be difficult to avoid. This may be achieved by making the portable housing sealed, and further by providing weatherproof receptacles (e.g., sockets) with suitable International Protection ("IP") code, e.g., socket with so-called IP66 rating, or any other standard or customized type.

The switching circuit allows for seamless transition between electrical power sources, minimizing disruption to one or more electrical power consumers which are being powered by their respective electrical power output. The device can provide significant advantages when at least some of the electrical sources are electrical energy units having their own energy storage reserve. Some examples of such energy units are energy storage based power supplies, fuel-cells or even combustion fuel based units. By "energy storage based power supplies" it is meant power supplies in which electrical energy is stored in one or more energy storage elements. Some non-limiting examples of energy storage elements are batteries, capacitors or super-capacitors, their likes or their combinations. Since such units have a limited energy storage reserve before it runs out, these units have a limited capacity for continuous operation. When the energy storage reserve depletes (e.g., while supplying power), it needs to be charged or recharged, e.g., by charging the batteries, or refilling the fuel, etc. This can involve disruption or downtime prior to continuing with the work at hand. Sometimes, the work at hand may need more time than a particular energy unit can continuously run for prior to needed a recharge or refill. In some case, this may involve swapping the depleted power source with another power source. This may cause interruption to the work at hand, specifically with sensitive appliances such as computers that may require lengthy start-up procedures or reconfiguration caused by the power disruption. A solution can be to choose a higher capacity unit, but that can be more expensive. Moreover, it may be heavier or less portable.

It shall be appreciated that the proposed devices and methods can allow multiple of smaller such energy units to operate in such a way that an essentially uninterrupted power can be provided for the work at hand (e.g., via one or more consumers which are receiving electrical power via the electrical device). The electrical device can thus utilize different types of power sources, such as mains grid power and/or energy units with their own energy storage reserves, providing options for reliable, renewable and sustainable powering of electrical consumers (or electrical loads).

In some non-limiting cases, any one of the electrical power inputs of the electrical device can be a primary input, or an input which is assigned high priority for selection of power source to be used (e.g., in all or some specific condition(s)). Thus, the electrical device may comprise a first electrical power input, which in certain non-limiting embodiments is a primary input. The primary input can be used to connect a preferable power source (e.g., mains grid power), which whenever it is available is used for powering at least some of the electrical power outputs. In case of an interruption at the primary input (e.g., detection of a first depletion signal indicative of an interruption in the electrical power at the first electrical power input), the controller may operate the to control the switching circuit to switch from the primary input to a second electrical power input in response to the depletion signal, thereby routing electrical power from the second electrical input to at least one of the electrical power outputs. However, the controller may operate the switching circuit to switch back to the first electrical power input in response to the detection of a power present signal (e.g., a first power present signal indicative of availability of a power source at the first input) or other indication of availability or power at the primary input. In this way, the primary input may act in certain conditions as a default source of electrical power whenever it is available. This can allow the limited reserve electrical energy units to function as backup units. For example, the primary input can be connected to a grid power or mains power which is available at fixed power outlets. That way, the device can work in an uninterrupted power supply mode. Hence, in this or other embodiments, wherein the first electrical power input is a primary input, the controller is operable to control the switching circuit from the second mode to the first mode in response to the power present signal of the first electrical power input. This would switch back to the primary input for powering one or more the electrical power outputs (e.g., those which are activated at that time).

It shall be appreciated that due to separatable connectable inputs, instead of grid power being connected to the primary input, any other preferred sources can be connected there. For example, a source which has the largest capacity, or a source which is cheaper to operate, or to connect different units such that their usage is harmonized. Other non-limiting examples of a power source can be a photovoltaic (PV) array or any other renewable power source.

The present teachings enable the electrical device to automatically determine the availability of power, improving the efficiency of power source management. Preferential source can be utilized as soon as it becomes available without manual intervention.

Thus, detection of power presence signal related to one or more electrical power inputs can facilitate energy-saving strategies by allowing the device to preferentially use a more cost-effective or environmentally friendly power source when available. In some cases, power present signal may be the converse of the depletion signal. E.g., if depletion signal for a particular source is "NO", power present signal of the electrical input where that source is connected may be "YES", and vice-versa. For example, while depletion signal is indicative of loss of power, the power present signal may indicate whenever the condition "loss of power" in not true.

In some non-limiting embodiments, a certain power source being "available" means that the depletion signal related to the source is indicative of that the energy reserve of that source satisfies a given criteria (e.g., it is above a predefined threshold and/or is in a stable state). Hence, when "available", the power source understood as being capable of supplying electrical power via the electrical device to the desired electrical power outputs, and hence to the consumers connected thereto.

It shall be appreciated that in some non-limiting embodiments, the sense circuit may be operable to detect a power present signal at (e.g., related to) one or more of the electrical power inputs, the power present signal being indicative of availability of a power source at that specific input (e.g., availability of electrical power at a given electrical power input).

Prioritizing the primary input ensures that the device operates using the preferred power source under normal conditions, which may be more stable or cost-effective. Automatic switching back to the primary input after a power interruption can reduce the need for manual resetting of the system, enhancing user convenience.

The ability to revert to the primary power source can optimize the use of secondary power sources, such as batteries, by preserving their charge for when they are truly needed.

It shall also be appreciated that the present teachings can also allow swapping electrical power sources while keeping the electrical power outputs powered (e.g., so called "hot-swapping" mode). For the sake of a non-limiting example, assuming that the electrical power outputs are being powered with a first power source connected at the first electrical power input, and there is a second power source connected and available at the second electrical power input. The first power source may be running low on capacity (e.g., battery discharged in the near future) due to which the user may want to replace the first power source with a third power source. The user may then simply unhook (e.g., by decoupling plug from its receptacle e.g., socket) the first power source from the first electrical power input. The electrical device will automatically detect a depletion signal at the first electrical power input (due to removal of the first power source), and switchover to sourcing power from the second power source connected at the second electrical power input, thereby allowing seamless operation of electrical consumers connected at the electrical power outputs. When the user connects the third power source at the first electrical power input, the electrical device detects power present signal at the first electrical power input. If the first electrical power input is a priority input, the electrical device switches back to sourcing power from the third power source connected at the first electrical power input. If the first electrical power input is not a priority input, the electrical device continues sourcing power from the second power source connected at the second electrical power input until it detects a second depletion signal indicative of loss of power at the second electrical power input. This is an example of how the proposed teachings can facilitate and simplify reliable and user-friendly powering of electrical consumers.

The electrical device may include a switching circuit which is operable to select (e.g., route) the electrical power input via which one or more electrical power outputs of the device are to be powered. In some non-limiting aspects, the device (e.g., as a part of the switching circuit) includes at least one protection device such as a residual-current detector ("RCD") per electrical output. Alternatively, or in addition, other protection devices such as one or more Insulation Monitoring Devices ("IMD") may be deployed for monitoring and/or safety override of the electrical device. A specific kind of protection device is not essential to the present teachings. This can help prevent electrical fault from one consumer from affecting one or more other electrical power consumers. This can also allow day-to-day users to use the device more safely, while providing multiple electrical power outputs or outlets to be able to power multiple electrical consumers from a single electrical device, and additionally providing an uninterrupted operation even in case one power sources fails, while other power sources connected at other inputs are available.

In some non-limiting embodiments, not all electrical power outputs may require a protection device (e.g., an RCD). Thus, in some cases, the switching circuit may be protected by a line breaker and split up to multiple power outputs (e.g., multiple power sockets). In some cases, each electrical power output is protected by a protection device, such as type-A or type-B RCD.

An advantage of providing an individual protection device per electrical power output is that this can prevent a fault current from flowing which is higher than the limit which each protection devices would tolerate. Due to this scheme, at least one of the protection devices would trip, thereby preventing a larger than tolerable fault current from flowing, thus improving safe operation via the electrical device. The electrical power outputs may additionally be protected by a circuit breaker.

Thus, at least in some non-limiting aspects, through the combination of a transfer switch capability with multiple protected outputs, especially in one portable housing, the present solution (e.g., the electrical device and/or related methods) can enable continuous operation of different kinds of equipment on demanding sites such as construction sites. The solution can be usable by a non-specialized (e.g., common) person.

In some non-limiting aspects, the electrical device can have three electrical power inputs, each protected by an input fuse. Each electrical power input can be switched through to power one or multiple outputs, e.g., three electrical power outputs. An advantage of the input fuse can be that it can improve overall protection of the electrical device. For example, in cases where one or more protection elements monitoring one or more electrical outputs do not trip on overload or an internal fault of the electrical device, the input fuse can detect an overcurrent condition irrespective of the location of the fault and cut-off input power.

The switching circuit can be controlled by controller (e.g., a microcontroller or any other computing unit) which monitors depletion signal (e.g., via sense circuit) and/or power present signal and determines electrical power from which electrical power input is to be passed through to the outputs.

In some cases, the depletion signal may be dependent on operational parameters e.g., voltage and/or frequency, related to an electrical power input (e.g., the first electrical power input) via which electrical power is supplied at one or more electrical power outputs. For example, if a drop in voltage (e.g., input voltage) is detected at the first electrical power input, a routing (e.g., switching) of electrical power from the first electrical power input to the second electrical power input may be performed, thereby routing electrical power from the second electrical input to at least one of the electrical power outputs.

Depletion signal (e.g., detecting depletion condition in the energy storage reserve) may for example be accomplished by detection of: increase, reduction or a fall in certain parameter related to an electrical power source, e.g., voltage and/or current and/or frequency of the electrical power source or at the electrical input where that power source is connected. In some non-limiting aspects, the depletion signal may be a power loss signal, i.e. a drop in the supply voltage and frequency by a certain amount within a given time. In some non-limiting aspects, a deviation value between input voltage waveform at the electrical input can be calculated from an expected voltage waveform. The depletion signal may be generated or calculated from this deviation value, or a series of time dependent deviation values. For example, it can be average or RMS voltage as described, but it can even be a metric that quantifies the spectral quality/purity of the input voltage waveform, such as harmonic distortion or a quantification of spectral noise. Sensors for providing depletion information in energy storage reserve may also include state of charge information providing a much more detailed picture of the status of the connected power supply. This may for example be achieved via a communications link between the device and one or more of the power sources. The communications link may at least partly be included in the electrical device e.g., in the form of one or more communication modules. The communications link may at least partly be included in one or more electrical power sources in the form of one or more communication modules. Without affecting the scope or generality of the present teachings, the terms "communications link", "communication link" and "communication module" will be used interchangeably in this disclosure. Communications link may include hardware components. In some non-limiting embodiments, communications link may also include software components.

In some cases, one of more of the electrical power sources may communicate their depletion signal by providing one or more pre-determined characteristics of the power provided at the electrical power input where the respective power source is connected. For example, an electrical power source may change its frequency in a particular value or manner which has a specific meaning on the controller side.

Alternatively, or in addition, the electrical power source may change other characteristics such as voltage which is delivered at the corresponding electrical power input. Alternatively, or in addition, deviation in operating frequency of the electrical power source may be monitored and/or used for communication (e.g., between an electrical power source and the electrical device, e.g., via communications link). For example, for communication, the source may vary its frequency in a controllable manner e.g., from 50 Hz to 50.5 Hz, continuously or it may switch between two or more predetermined levels (e.g., within specific time intervals). The levels may be centered around a certain frequency value, for example, the frequency of an electrical power source may intermittently switch between 49.5 Hz and 50.5 Hz so that the time average value is centered at 50 Hz. An advantage of doing this can be that the varying/switching instances can be used to communicate with the electrical device (e.g., providing depletion information) by encoding any suitable protocol, e.g., a timing protocol, bit stream, their likes or combinations.

In response to the depletion signal indicating that a power source is close to interrupting electrical power being delivered at one of the electrical power inputs (e.g., first electrical power input) the controller may initiate switching to another power source (e.g., by routing power from second electrical power input).

Such switching in response to the depletion signal may help to maintain constant operations and manage energy reserves effectively.

In some non-limiting embodiments, the electrical device may comprise a plurality of electrical power outputs (or at least two electrical power outputs). It shall be appreciated that there can also be provided an electrical device comprising a first electrical power input connectable to receive electrical power from a first power source; a second electrical power input connectable to receive electrical power from a second power source different from the first power source; and at least two electrical power outputs; each electrical power output being connectable to supply electrical power to an individual (e.g., separate) electrical power consumer by a switching circuit operable to route electrical power from the first electrical input to one or more of the electrical power outputs, wherein electrical device also comprises: a sense circuit operable to detect a depletion signal indicating an interruption in the electrical power which is being provided at the first electrical input; a controller operable to control the switching circuit to switch from the first electrical power input to the second electrical power input in response to the depletion signal, thereby routing electrical power from the second electrical input to one or more of the electrical power outputs.

It shall be appreciated that by "routing power", in this disclosure it is meant providing electrical power from a given electrical power input to one or more of the power outputs. Thus, it is here meant that the power input which is selected to provide power may be connected to a single electrical power output of the plurality of available power outputs, e.g., one single power output (e.g., preselected electrical power output), to any subgroup of power outputs, or to all power outputs.

In some non-limiting aspects, the sense circuit may be provided information indicative of an electrical power source being available (e.g., to supply electrical power at one of the electrical power inputs). The "availability" of a power source refers to that electrical power source's ability to supply electrical power at the respective input of the electrical device. A power source may be considered "available", e.g., via the power present signal being detected, and/or by providing signal indicative of conditions such as any one or more of: the power source is operational, it has sufficient energy reserve, and can provide electrical power with acceptable characteristics (e.g., voltage and frequency) for powering the loads connected to the electrical device's output(s). A power source's availability may be communicated to the electrical device through communications link which may be based on any communication protocol (e.g., standard or proprietary, wired or wireless, etc.). The communications link may facilitate signals (e.g., data) which could articulate operating status (e.g., real-time or near real-time) of the power source, including any indictors or metrics of available power capacity or energy reserve level. Some communication aspects, e.g., via parameters of the electrical power source, were discussed earlier in the present disclosure.

The depletion signal and/or the power present signal may be communicated via the communications link that may act as an intermediary between one or more of the power sources and the controller. The communications link may be wired and/or wireless, based on, e.g., power-line communication, ethernet, Bluetooth, mobile/cellular network, WiFi or any other suitable technology such as BUS communication, for example via CAN (Controller Area Network) bus/protocol. Here, wired connections are meant to include physical wires or cables that connect the power source to the communications link. An example might include an RS-232, USB, or Ethernet cable that is operable to transmit signals between the device and the source.

It shall be appreciated that Power-Line Communication (PLC) may be especially advantageous in certain aspects, as the same electrical cable which is used to connect a power source at a given electrical power input may also be used as a part of the communications link to establish communication between the power source and the device. Thus, in certain non-limiting aspects, PLC is used to at least partially provide depletion signal and/or power present signal at the electrical device.

Wireless Connections may utilize any one or more wireless communication standards, such as Bluetooth, Zigbee, Wi-Fi, or cellular networks (GSM, LTE). For example, the power source may send depletion and/or power present status signal over Wi-Fi to the communications link.

In certain non-limiting aspects, the communications link may receive signals from one or more sensors monitoring a power source's physical parameters (e.g., voltage, frequency, capacity (e.g., remaining, rate of consumption), uptime, or state of charge). For example, a battery based electrical power source could have a monitoring system that measures its one or more parameters (e.g., voltage, state of charge, capacity or their likes and/or their combinations) and provides this information (e.g., via communications link) wired and/or wirelessly to the device. If, e.g., the voltage falls below a certain level, the sense circuit may interpret this as a depletion signal which is provided to the controller. Similarly, e.g., when the sense circuit receives a signal that one or more parameters, such as voltage from a given power source are back within acceptable range, it may be interpreted as a power present signal, indicating that the power source is available again for supplying electrical power at the respective electrical power input. The controller may in response to this power present signal decide to power one or more of the outputs from that back-online power source. It shall be appreciated that this is particularly the case when the back-online source is connected to a primary input of the electrical device. In other cases, the controller may continuing to provide electrical power from the source it is connected to (e.g., at second electrical input) until a second depletion signal is detected. The second depletion signal being indicative of an interruption in the electrical power at the second electrical input, at which point the controller may switch to one of the other inputs (e.g., the input connected to the back-online power source). The latter may be the case e.g., when both inputs have equal priority. In such cases, rather than switching back and forth, the controller may switch only when needed (e.g., when an interruption in electrical power is imminent). That way the utilization of multiple power sources can be maximized and switching operations minimized.

Thus, in a non-limiting aspect, the controller is operable to prevent the switching circuit to transition from the second mode to the first mode (e.g., the controller is operable to prevent the switching circuit from switching from the second electrical power input to the first electrical power input) until a second depletion signal occurs. The second depletion signal being indicative of an interruption in the electrical power which is being provided at the second electrical power input. The controller's ability to prevent premature switching back to the first electrical power input until the second depletion signal occurs can thus help to avoid unnecessary cycling between power sources, which can reduce wear on the switching circuit and improve overall system longevity. By ensuring that the device remains powering from the second electrical power input until an imminent power interruption there is detected, the controller can maximize the use of available power sources, leading to more stable operation and potentially reducing the frequency of manual interventions required to manage the power sources.

In some non-limiting embodiments, the electrical device comprises at least three electrical power inputs and at least three electrical power outputs. In some non-limiting embodiments, the electrical device comprises three electrical power inputs and three electrical power outputs. In some non-limiting embodiments, one of the inputs (e.g., the first electrical power input) is a primary input. In some non-limiting embodiments, any of the power inputs may be configured as a primary input.

In some non-limiting embodiments, at least some and preferably all components of (e.g., internal components) the electrical device are powered via electrical power which is available at any one or more of the electrical power inputs. The input via which the components of the electrical device are powered may be the same input which is powering the output(s), or it may be another input at which electrical power is also available. For example, the components including: the controller, the sense circuit and the switching circuit may either be powered via the first electrical power input, or at least some of them may be powered via one or more other inputs at the power is available. Accordingly, at least some of the components may also have a switchable connection to multiple inputs. This can allow flexible, more reliable and efficient use of available power. Moreover, a need of providing an internal power source may be alleviated. This can also reduce parts of the device (e.g., an internal battery) which may need replacement or require special handling/storage conditions.

In addition, or alternatively to the other modes of operation herein discussed, the electrical device may provide an "emergency operation" (e.g., "emergency lighting") mode. In one such mode, it may be monitored (e.g., via the sense circuit) presence of a depletion signal at a predetermined input (e.g., the primary input) while at least one of the electrical outputs is unpowered (e.g., not supplied any electrical power). In response to the depletion signal (indicative of loss of power at the predetermined input), at least one of the outputs which were unpowered are provided (e.g., routed) electrical power via one of the inputs where electrical power is available. In some non-limited embodiments, the unpowered outputs may be connected to emergency equipment such as emergency lights or other backup equipment which are powered automatically in response to the depletion signal. In response to the depletion signal, the device may or may not continue to power those outputs which were powered via the primary input. Thus, in response to the depletion signal, emergency equipment can be powered by one of the other inputs (e.g., connected to a battery power source) while remaining output(s) may or may not be powered dependent on how the device is configured.

Such mode can be particularly advantageous in event spaces and locations where operation of backup equipment (e.g., emergency lighting) is required (e.g., for safety rules). In such a mode, the device would monitor an input (e.g., the primary input), typically connected to the mains power, for a depletion signal. In the event of mains failure, indicated by a depletion signal from the primary power input, the device would function as mentioned above.

Accordingly, there can also be provided an electrical device comprising:

- a first electrical power input connectable to receive electrical power from a first power source;
- a second electrical power input connectable to receive electrical power from a second power source different from the first power source;
- at least one electrical power output, each electrical power output being connectable to supply electrical power to an individual electrical power consumer;
- a sense circuit operable to detect a depletion signal indicating an interruption in the electrical power which is being provided at the first electrical input;
- a switching circuit operable to prevent electrical power (e.g., flow of power) from the first electrical input to at least one of the electrical power outputs;
- a controller operable to control the switching circuit to switch the second electrical power input in response to the depletion signal, thereby routing electrical power from the second electrical input to the at least one of the electrical power outputs.

Similar to as was mentioned, the electrical device may be a portable device. Thus, there can also be provided a portable electrical device comprising:

- a first electrical power input connectable (e.g., separatably connectable, e.g., via a receptable) to receive electrical power from a first power source;
- a second electrical power input connectable (e.g., separatably connectable, e.g., via a receptable) to receive electrical power from a second power source different from the first power source;
- at least one electrical power output, each electrical power output being connectable to supply electrical power to an individual electrical power consumer;
- a sense circuit operable to detect a depletion signal indicating an interruption in the electrical power which is being provided at the first electrical input;
- a switching circuit operable, (e.g., in a third mode), to prevent electrical power (e.g., flow of power) from the first electrical input to at least one of the electrical power outputs;

a controller operable, (e.g., in a fourth mode), to control the switching circuit to switch the second electrical power input in response to the depletion signal, thereby routing electrical power from the second electrical input to the at least one of the electrical power outputs.

Thus, the "third mode" may be understood as a mode in which power from the first electrical input is prevented from being available (e.g., by being coupled to) at least one, some, or all of the electrical power outputs.

The "fourth mode" may be understood as a mode in which power from the second electrical input is provided (e.g., coupled, made available, or allow to flow to) at least one, some, or all of the electrical power outputs. The first electrical power input is decoupled from the electrical power outputs.

In this or other embodiments, a power present signal is detected at the first electrical power input, in response to which the controller is operable to control the switching circuit from the fourth mode to the third mode.

It shall be appreciated that the electrical power sources as discussed in this disclosure may be AC power sources, or they may be DC power sources. Moreover, there is no limitation as to whether the AC power sources are single-phase AC power sources, or they are multi-phase AC power sources (e.g., split phase or 3-phase AC power sources).

It shall be appreciated that the controller as discussed herein may be embodied as one or more components. For example, a microcontroller can be used as the controller or controlling means for the electrical device. The controller may have one or more input and/or output interfaces. The controller may process digital signals received via sensors and/or interface(s), and control the device's functionality through software-defined logic.

In some non-limiting embodiments, the switching circuit is operable with a break-before-make logic. Accordingly, e.g., for switching from the first electrical power input to the second electrical power input, the switching circuit may disconnect from the first electrical power input prior to connecting to the second electrical power input for routing power from an electrical power source connected at the second electrical power input. Thus, for each, or some, switching operation the switching circuit may disconnect from an electrical power input prior to connecting to another input. This can prevent in some conditions the switching circuit from connecting to two power sources at the same time which may cause short circuit currents and potentially other system instabilities due to a lack of phase and/or frequency synchronization between the two sources.

Additionally, or alternatively, in some non-limiting embodiments, the switching circuit is operable with a make-before-break logic. Accordingly, e.g., for switching from the first electrical power input to the second electrical power input, the switching circuit may connect to the second electrical power input prior to disconnecting from the first electrical power input for routing power from an electrical power source connected at the second electrical power input. In this mode, the switching circuit will minimize the time of overlapped connection to both inputs to minimize any short circuit currents and/or other non-desired effects. Thus, for each, or some, switching operation the switching circuit may connect to another electrical power input prior to disconnecting from an electrical power input in such a way that the time-period of simultaneous connection to the two inputs is as short as possible. By "as short as possible", it is here meant ideally zero (no overlapped connection), or as close as possible to zero, however below a few milliseconds (e.g., one millisecond, in microseconds range, or in nanoseconds) could be tolerable dependent e.g., on the types of power sources, specifications of the switching stage. An advantage of doing this is that the electrical power outputs can be kept continuously powered with no delay in sourcing power (e.g., from the another electrical power input).

It shall be appreciated that certain parts of the device may be implemented as at least partially in software logic form. For example, the switching circuit may be a combination of hardware and software parts.

It shall be appreciated that in certain non-limiting embodiments, the switching circuit may comprise switching components, e.g., any one or more or their combinations of: relay, contactor, semiconductor switches or their likes.

In certain non-limiting embodiments, the electrical power outputs may be protected with circuit breaker. In some non-limiting embodiments, a common circuit breaker for the power outputs may be used for protection from undesired conditions such as overload or short circuit. The circuit breaker may be responsive to a maximum power that can be delivered or distributed by the electrical device.

It shall be appreciated that there can also be provided methods for operating an electrical device. Moreover, there can also be provided software product comprising instructions which when executed by suitable device (e.g., an electrical device) cause the device to perform the herein disclosed methods. The instructions may be executed via a computer processor (e.g., the controller). The software may be embodied on a computer storage medium such as non-transitory computer storage.

For example, there can be provided a method for operating an electrical device, the method comprising:

providing (e.g., selecting) from one of the electrical power inputs of the electrical device, a first electrical power input where electrical power is available;

routing electrical power from the first electrical power input to at least one electrical power output of the electrical device;

detecting a first depletion signal indicative of an interruption in the electrical power at the first electrical power input;

selecting a second electrical power input of the electrical device where electrical power is available;

switching from the first electrical power input to the second electrical power input in response to the first depletion signal, thereby routing electrical power from the second electrical input to the at least one of the electrical power outputs.

The device may be a portable electrical device. From the foregoing, it shall be appreciated that there can also be provided a method for operating an electrical device (e.g., portable device), the method comprising:

providing, at a first electrical input of the electrical device, a separable connection to a first power source;

providing, at a second electrical input of the electrical device, a separable connection to a second power source;

routing, in a first mode, electrical power which is available at the first electrical power input to one or more electrical power outputs of the electrical device; and preventing power from the second electrical input from being delivered to the electrical power outputs, detecting a first depletion signal indicative of an interruption in the electrical power at the first electrical power input;

selecting the second electrical power input of the electrical device where electrical power is available;

switching, in response to the first depletion signal, from the first mode to a second mode in which electrical power from the second electrical input is routed to the at least one of the electrical power outputs, and power from the first electrical power input is prevented from being delivered to the electrical power outputs.

It shall be appreciated that detection of the depletion signal may be done via sense circuit as discussed herein. Switching from the first electrical power input to the second electrical power input may be done via switching circuit as discussed herein. The switching circuit may be controlled via controller as discussed herein. It shall also be appreciated in certain non-limiting embodiments, functional blocks discussed herein may be parts of the same component. For example, functions of switching circuit and sense circuit may be performed by the same component, or can be contemplated e.g., that any two or more of: controller, sense circuit and switching circuit are the same component. Moreover, it is possible that certain functions may be distributed to different components.

It shall be appreciated that the method may also comprise:

detecting a first power present signal indicative of availability of a power source at the first input;

switching back from the second electrical power input to the first electrical power input in response to the first power present signal, thereby routing electrical power from the first electrical input to the at least one of the electrical power outputs.

Alternatively, or in addition, the method may comprise:

detecting a first power present signal indicative of availability of a power source at the first input;

continuing to provide electrical power from the second electrical input to the at least one of the electrical power outputs until a second depletion signal is detected; the second depletion signal being indicative of an interruption in the electrical power at the second electrical input, switching from the second electrical power input to the first electrical power input in response to the second depletion signal, thereby routing electrical power from the first electrical input to the at least one of the electrical power outputs.

It shall be appreciated that there can also be provided a method for operating an electrical device, the method comprising:

preventing electrical power from at least one of the electrical power inputs of the electrical device from being routed to at least one electrical power output of the electrical device;

detecting a first depletion signal indicative of an interruption in electrical power at a first electrical power input (e.g., primary input) of the electrical device;

selecting a second electrical power input of the electrical device where electrical power is available;

providing electrical power from the second electrical power input to at least one of the electrical power outputs.

In other words, there can also be provided a method of operating a portable electrical device, the method comprising:

providing, at a first electrical input of the electrical device, a separable connection to a first power source;

providing, at a second electrical input of the electrical device, a separable connection to a second power source (e.g., the second power source being different from the first power source);

preventing, in a third mode, electrical power which is available at the first electrical power input from being available at one or more electrical power outputs of the electrical device; each electrical power output being (e.g., separatably) connectable to supply electrical power to an individual electrical power consumer, detecting a first depletion signal indicative of an interruption in the electrical power at the first electrical power input;

selecting the second electrical power input of the electrical device where electrical power is available;

switching, in response to the first depletion signal, from the third mode to a fourth mode in which electrical power from the second electrical input is routed to (e.g., provided to, or made available at) the at least one of the electrical power outputs.

It shall be appreciated that in the fourth mode the first electrical power input is isolated from the electrical power outputs.

The modes are as they were discussed in other places in this disclosure.

The method can thus be used to implement the emergency (e.g., emergency lighting) operation mode as discussed herein.

In some non-limiting embodiments, the step of preventing of electrical power may be:

preventing electrical power from any of the electrical power inputs of the electrical device from being routed to at least one electrical power output of the electrical device, thereby keeping the at least one electrical power output being unpowered.

Thus, the at least one electrical power output is powered via the second electrical power input in response to the first depletion signal. It shall be appreciated that in some cases, none of the electrical power outputs may be powered until the first depletion signal is detected.

BRIEF DESCRIPTION OF THE DRAWINGS

Certain embodiments will now be discussed with reference to the appended figures which illustrate the present teachings by way of non-limiting examples which can be used to realize products, methods, and software pursuant to the present teachings. For brevity, the example realizations shown in the following figures show two-terminal power inputs and outputs. It shall be appreciated that this however is not limiting to the scope or generality of the present teachings. Accordingly, the teachings cover not only single-phase, but also multi-phase such as split-phase and 3-phase power sources and their distribution. Hence, even though not explicitly shown in the following figures, e.g., a three-phase AC system is also realizable using the present teachings.

The following figures show examples with certain number of inputs and outputs. This is not limiting to the scope or generality. It can, for example, be envisaged to build a system with two inputs and a single output as well thereby still enjoying many advantages provided by the present teachings.

DETAILED DESCRIPTION

Figure 1:
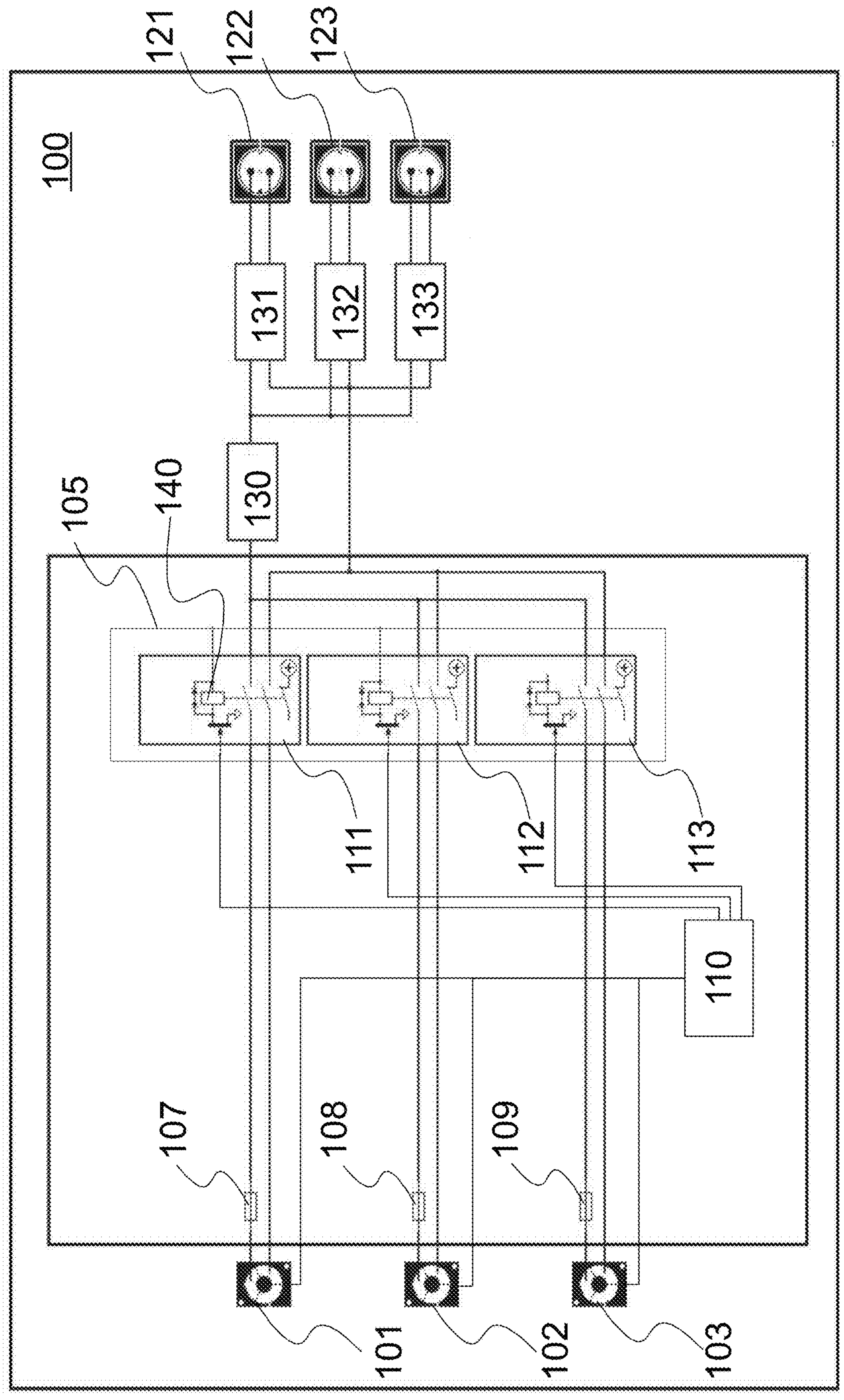
FIG. 1 is a block diagram of an electrical device according to some non-limiting aspects of the present disclosure.

For purposes of the description, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. The terms "first," "second," or "third" and their likes have been used to establish a reference to the corresponding feature. For the purposes of scope of the present teachings, saying "first" or "second" does not mean that a particular feature must be attached with a particular sequence or order to be valid. It is also to be understood that the specific devices and processes illustrated in the attached drawings, and described in the following specification, are simply examples and non-limiting embodiments or aspects of the disclosed subject matter. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

FIG. 1 shows a block diagram of an electrical device 100, which may be in the form of a portable AC power distributor or an automatic power transfer switch. The device 100 comprises three electrical power inputs 101, 102, 103 (shown here as input sockets or receptacles) for separably connecting to power sources such as portable battery power supplies, generators, fuel cells, and also mains power which are located externally to the device 100. The inputs are separatably connectable to a variety of power sources by a common user without needing specialized training for connecting or disconnecting the power sources to the device 100.

In certain cases, the first power input 101 may be a primary input pursuant to the present disclosure. The status of primary input may either be fixed to a predetermined input (e.g., the first power input 101), or it may be assignable to any of the inputs (e.g., selectable by the user). In some cases, first power input 101 may be connected to mains grid power. Any or both of second input 102 and third input 103 may be connectable to power sources having their respective energy reserve. It is also possible that all three electrical power inputs 101, 102, 103 are connected to individual power sources each having its own energy reserve (e.g., limited fuel supply, charge, capacity, or their likes).

The power inputs 101, 102, 103 are connected to switching circuit 105. The switching circuit 105 comprises three switching components, shown here as relays 111, 112, 113 that are each connected respectively to one of the power inputs 101, 102, 103. On the output side of the switching stage 105, the contacts of the relays are connected so that any of the power inputs 101, 102, 103 may be used to route power the three electrical power outputs 121, 122, 123. In some cases, at least some of the electrical power outputs 121, 122, 123 may be individually disconnectable internally via the device 100 such that they are prevented from receiving electrical power which is being provided at other electrical power outputs (this aspect is not shown in FIG. 1).

The inputs 101, 102, 103 are in this example case each shown respectively protected via their own fuse 107, 108, 109.

The power inputs 101, 102, 103 may include a sense circuit for providing depletion information or depletion signal for the power source connected to the respective power input 101, 102, 103 to a controlling means, shown here implemented as a controller 110.

Controller 110 is connected to control inputs of the relays 111, 112, 113. The controller 110 is operable such that at any given time only one of the power inputs 101, 102, 103 may be continuously connected to the power outputs 121, 122, 123.

If for example, the power input 101 would be used for providing power at the outputs 121, 122, 123, the relay 111 would e.g., be in an energized state (e.g., "ON" state e.g., by energizing first relay coil 140) thus connecting power conductors originating from the first power input 101 to the power outputs 121, 122, 123. During this time, relays 112 and 113 would e.g., be in deenergized state (e.g., "OFF"), resulting in their respective power conductors to be isolated from the power outputs 121, 122, 123. This may be understood as a first mode of operation of the electrical device 100.

In response to a depletion signal (e.g., first depletion signal, e.g., detected by sense circuit) related to the first input 101, the controller 110 may deenergize the first relay 111 and energize the second relay 112, thus connecting the second power input 102 to the power outputs 121, 122, 123. This may be understood as a second mode of operation of the electrical device 100. Hence, in this example, in response to the depletion signal, the controller 110 causes the switching stage 105 to go from the first mode to the second mode.

The energization/de-energization may be done in a break-before-make fashion, or in make-before-make fashion. In this example, the sense circuit is a part of the controller 110. Thus, controller 110 is operable to detect the depletion signal related to any of the inputs 101, 102, 103. The first depletion signal or depletion information, may e.g., in the form of one or more operational parameters related to the power source which us connected at the first input 101. For example, the depletion signal may correspond to a change in voltage of power source connected at the first input 101 and/or it may be a change in the frequency of the power source. The first depletion signal is indicative of that a loss of power at the first input 101 is imminent. As an example, imminent may be considered any event occurring within time from less than a second (e.g., in microseconds) to minutes or tens of minutes, but usually not larger than an hour. In some cases, the depletion signal may be communicatively provided e.g., via a communications link (not shown in FIG. 1) between the power source and the device 100. In some cases, the communications link may at least partially be included in the separatably connectable connection between the source and the respective electrical power input (e.g., as PLC). The separatably connectable connection (e.g., the inputs 101, 102, 103 and their corresponding cables for connecting to the power sources) preferably comprise power sockets/plug arrangement which is connectable/disconnectable by a common user.

On the output side, the device 100 comprises safety components such as line breaker 130 and other protection devices 131, 132 and 133 such as RCDs (shown in this example as each one dedicated to each of the outputs 121, 122 and 123).

Figure 2:
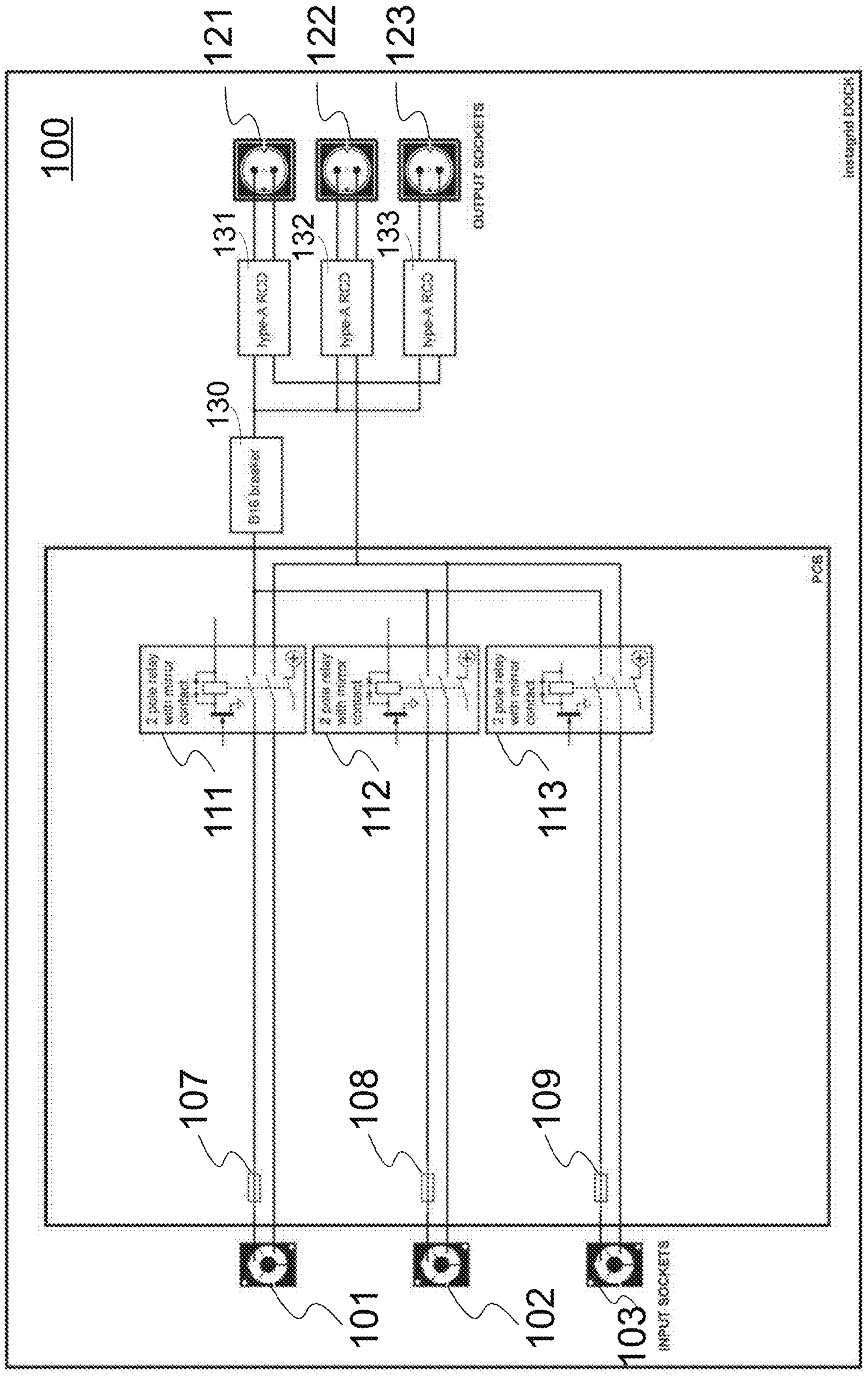
FIG. 2 is a block diagram of an electrical device according to some non-limiting aspects of the present disclosure.

FIG. 2 shows an alternative view of the electrical device 100, particularly showing how electrical power inputs 101-103 (e.g., receptacles, e.g., input sockets) are arranged to connect to the electrical power outputs 121-123 (e.g., output sockets). The line breaker 130 may for example be a B16 Breaker. Other protection devices 121, 122 and 123 are shown here as type-A RCDs.

Figure 3:
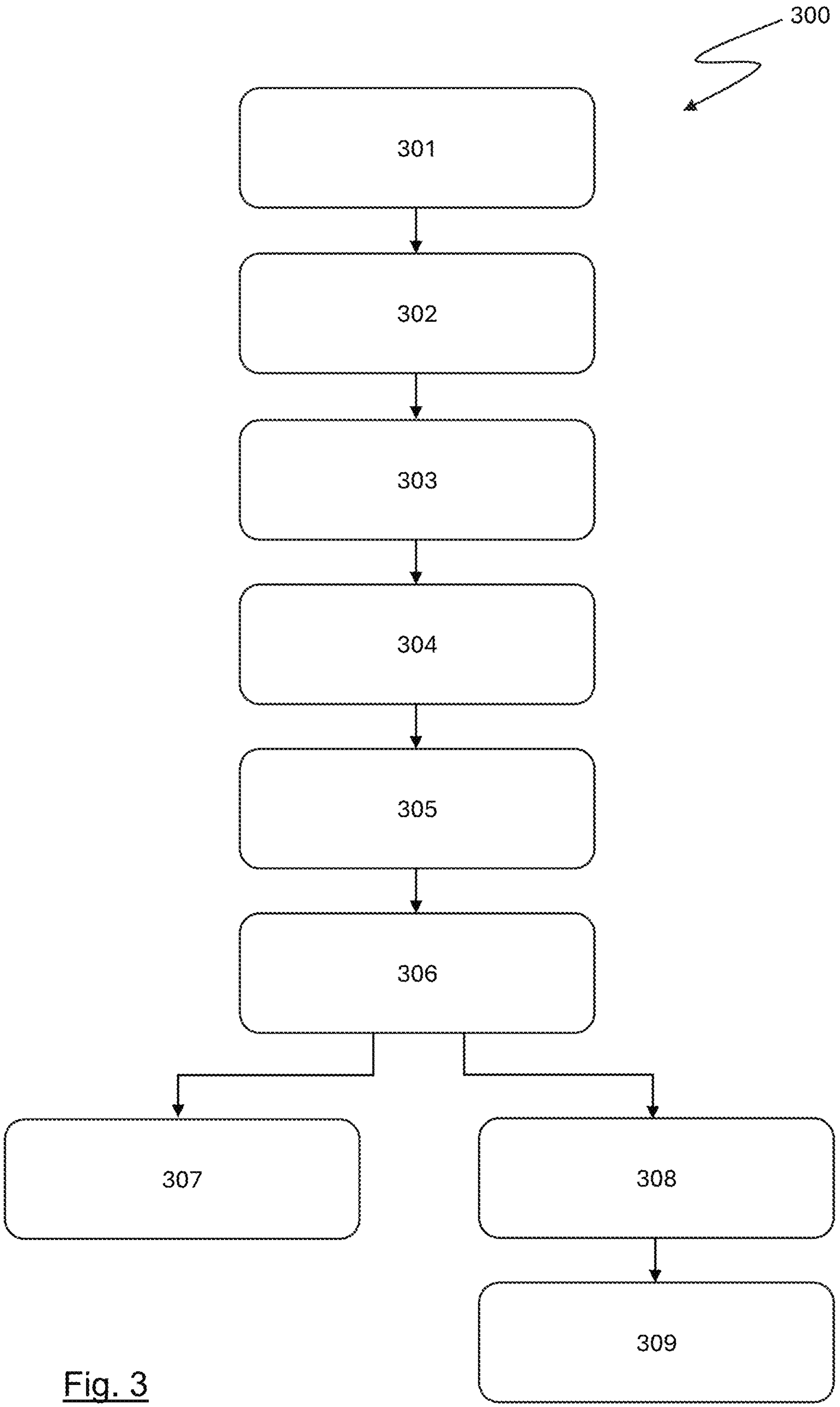
FIG. 3 is a flow diagram of an example method of operating an electrical device according to some non-limiting aspects of the present disclosure.

With reference to FIG. 3, which shows a flowchart 300 depicting a method aspect of the present teachings. The method aspects may be realized independently or as combination to each another via the electrical device 100 e.g., as discussed as various aspects in the previous figures and the rest of present disclosure. The flowchart 300 may also be used to realize a software product.

In 301, it is provided a first electrical power input 101 where electrical power is available. The electrical power input 101 is one of the electrical power inputs of the electrical device 101. In some embodiments, the first electrical power input 101 may be selected (e.g., by the controller 110) in response to a power present signal indicative of presence of electrical power at first electrical power input 101. The power present signal, which may or may not be an inverse of the depletion signal, may be detected by the sense circuit which in certain embodiments be a part of the controller 110.

In 302, electrical power from electrical power input 101 is provided (e.g., electrically routed) to at least one electrical power output of the electrical device 100. In some cases, the electrical power may be routed to all electrical power outputs 121, 122, 123.

In 303, it is detected a first depletion signal indicative of an interruption in the electrical power at the first electrical power input 101.

In 304, it is selected a second electrical power input 102 of the electrical device 100 where electrical power is available (e.g., on basis of a power present signal related to the second electrical power input 102).

In 305, in response to the first depletion signal, a switchover is made from the first electrical power input 101 to the second electrical power input 102, thereby routing electrical power from the second electrical input 102 to the at least one of the electrical power outputs (e.g., any or all electrical power outputs 121, 122, 123).

Optionally as a following or independent mode, in 306, it is detected a first power present signal indicative of availability of electrical power (e.g., power source present) at the first input 101.

Optionally as a following or independent mode, in 307, it is switched back from the second electrical power input 102 to the first electrical power input 101 in response to the first power present signal, thereby routing electrical power from the first electrical input 101 to the at least one of the electrical power outputs.

It shall be recognized that steps 306 and 307 may correspond to an operating mode in which the first input 101 is a primary input.

In another optional or independent mode, in 308 it is continued providing electrical power from the second electrical input 102 to the at least one of the electrical power outputs until a second depletion signal is detected, despite the first power present signal being detected. The second depletion signal is indicative of an interruption in the electrical power at the second electrical input.

In 309, it is switched from the second electrical power input 102 to the first electrical power input 101 in response to the second depletion signal, thereby routing electrical power from the first electrical input 101 to the at least one of the electrical power outputs.

Figure 4:
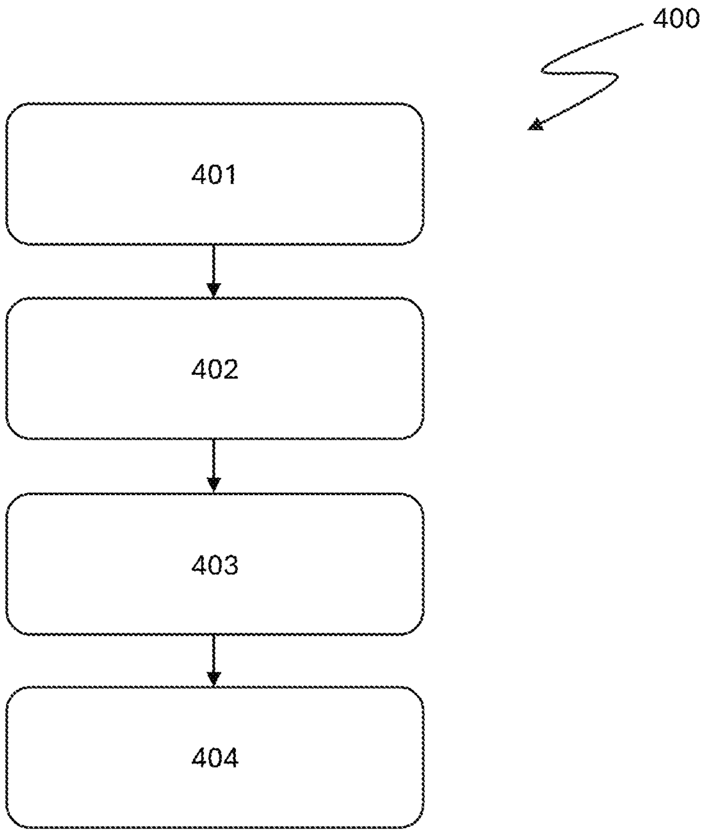
FIG. 4 is a flow diagram of an example method of operating an electrical device according to some non-limiting aspects of the present disclosure.

With reference to FIG. 4, which shows another flowchart 400 depicting a method aspect of the present teachings. The method aspects may be realized independently or as combination to each another via the electrical device 100 e.g., as discussed as various aspects in the previous figures and the rest of present disclosure. The flowchart 400 may also be used to realize a software product.

In 401, it is prevented a connection of electrical power from at least one of the electrical power inputs of the electrical device 100 to at least one electrical power output of the electrical device 100. In other words, at least one of the electrical power outputs is kept unpowered by electrical power which is available at an input of the device 100. The electrical power which being is prevented from said at least one power output, may be provided to other power outputs of the device 100, or it is possible that none of the outputs are being powered while at least electrical power is available at at least one of the inputs of the device 100. As an example case, in 401 it may be prevented a connection of electrical power from the first input 101 to the outputs 121-123. The first input 101 is connected to a main power source (e.g., mains grid power). At least one of the outputs 121-123 is connected to an emergency equipment. For example, all outputs 121-123 are connected to electrical consumers such as emergency lighting, ventilator, or any other equipment operable by electrical power.

In 402, it is detected a first depletion signal indicative of an interruption in electrical power at the first electrical power input 101 (e.g., primary input) of the electrical device 100.

In 403, it is selected a second electrical power input 102 of the electrical device 100 where electrical power is available.

In 404, it is provided electrical power from the second electrical power input 102 to at least one of the electrical power outputs (e.g., all outputs 121-123 which are connected to the electrical consumers such as emergency lighting, etc.). Thus, it is allowed that these equipment are automatically activated when main power fails. Since the device 100 is a standalone unit separably connectable to a variety of power sources and consumers, this is also one of the beneficial modes which can be realized by the proposed teachings.

It shall be appreciated that the flowcharts 300 and 400 can also be implemented via the same device 100 as distinct or seamless operational modes.

Although embodiments or aspects have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

Certain aspects of the present teachings will now be summarized in the following clauses:

Clause 1: An electrical device comprising:
- a first electrical power input connectable to receive electrical power from a first power source;
- a second electrical power input connectable to receive electrical power from a second power source different from the first power source;
- at least one electrical power output, each electrical power output being connectable to supply electrical power to an individual electrical power consumer;
- a switching circuit operable to route electrical power from the first electrical input to at least one of the electrical power outputs;
- a sense circuit operable to detect a depletion signal indicating an interruption in the electrical power which is being provided at the first electrical input;
- a controller operable to control the switching circuit to switch from the first electrical power input to the second electrical power input in response to the depletion signal, thereby routing electrical power from the second electrical input to at least one of the electrical power outputs.

Clause 1a: A portable electrical device comprising:
- a first electrical power input separably connectable to receive electrical power from a first power source;
- a second electrical power input separably connectable to receive electrical power from a second power source different from the first power source;
- at least one electrical power output, each electrical power output being separably connectable to supply electrical power to an individual electrical power consumer;
- a switching circuit operable in a first mode to route electrical power from the first electrical input to at least one of the electrical power outputs; wherein in the first mode, power from the second power source is prevented from being delivered to the electrical power outputs,
- a sense circuit operable to detect a depletion signal indicating an interruption in the electrical power which is being provided at the first electrical input;
- a controller operable to control the switching circuit, in a second mode, to switch from the first electrical power input to the second electrical power input in response to the depletion signal, thereby routing electrical power from the second electrical input to at least one of the electrical power outputs.

Clause 2. Electrical device of clause 1 or clause 1a, wherein, the sense circuit is also operable to detect a power present signal at the electrical power inputs indicating availability of a power source at that specific input.

Clause 3. Electrical device of clause 2, wherein the first electrical power input is a primary input such that the controller operable to switch back to the primary input in response to the power present signal of the first electrical power input.

Clause 3a. Electrical device of clause 2, wherein the first electrical power input is a primary input such that the controller is operable to control the switching circuit from the second mode to the first mode to switch back to the primary input in response to the power present signal of the first electrical power input.

Clause 4. Electrical device according to any of the previous clauses, wherein the first power source is a mains grid power.

Clause 5. Electrical device of any of the above clauses, wherein each electrical power input is separatably connectable to its corresponding power source (e.g., in a manner to be usable by a common user).

Clause 6. Electrical device according to any of the previous clauses, wherein the first power source and/or the second power source is an energy unit having its own energy storage reserve.

Clause 7. Electrical device of clause 6, wherein any of the energy storage reserves is a battery and/or fuel cell and/or capacitor and/or fuel.

Clause 8. Electrical device of any of clauses 6 or 7, wherein the depletion signal is indicative of a predetermined limit of remaining energy storage reserve of the energy unit which is powering at least one of the electrical power outputs.

Clause 9. Electrical device of any of the previous clauses, wherein the depletion signal involves a change in a physical parameter at the first electrical power input and/or the energy unit which is powering at least one of the electrical power outputs.

Clause 10. Electrical device of any of the previous clauses, wherein the depletion signal involves a change in a frequency at the first electrical power input.

Clause 11. Electrical device of any of clauses 2 to 10, wherein the controller is operable to prevent the switching circuit from transitioning from the second mode to the first mode (e.g., preventing the switching circuit from switching from the second electrical power input to the first electrical power input) until a second depletion signal occurs, the second depletion signal being indicative an interruption in the electrical power which is being provided at the second electrical power input.

Clause 12. Electrical device of any of clauses 2 to 11, wherein power present signal for any of the respective electrical power inputs involves sensing a physical parameter at that electrical power input.

Clause 13. Electrical device of any of the previous clauses, wherein depletion signal and/or power present signal for any of the respective electrical power inputs is provided via a communication link or module operatively coupled to the corresponding power source connected at the respective electrical power input.

Clause 14. Electrical device of any of the previous clauses, wherein the controller is operable to control the switching circuit in a break-before-make or a make-before-break fashion when switching to a different electrical power input.

Clause 14a. Electrical device of an of the previous clauses, wherein the device is dust and/or moisture resistant, for example, having a suitable IP rating. As non-limiting examples, IP rating may be IP53, IP54, IP55, IP56, IP63, IP64, IP65, IP66, or better) for ingress protection.

Clause 15. Electrical device of any of the previous clauses, wherein the switching circuit comprises a protection device (residual-current device ("RCD") and/or Insulation Monitoring Device ("IMD")) for each or some of the at least one electrical power output, preferably at least one protection device such as a residual-current device ("RCD") per electrical power output.

Clause 15a. A (e.g., portable) electrical device comprising:
- a first electrical power input connectable (e.g., separatably connectable, e.g., via a receptable) to receive electrical power from a first power source;
- a second electrical power input connectable (e.g., separatably connectable, e.g., via a receptable) to receive electrical power from a second power source different from the first power source;
- at least one electrical power output, each electrical power output being connectable to supply electrical power to an individual electrical power consumer;
- a sense circuit operable to detect a depletion signal indicating an interruption in the electrical power which is being provided at the first electrical input;
- a switching circuit operable, (e.g., in a third mode), to prevent electrical power (e.g., flow of power) from the first electrical input to at least one of the electrical power outputs;

a controller operable, (e.g., in a fourth mode), to control the switching circuit to switch the second electrical power input in response to the depletion signal, thereby routing electrical power from the second electrical input to the at least one of the electrical power outputs.

Clause 15b. The electrical device of clause 15a, wherein in response to a power present signal detected at the first electrical power input, the controller is operable to control the switching circuit from the fourth mode to the third mode.

Clauses 2-15 apply also to clauses 15a and 15b. Hence the device of clauses 15a-b can comprise features of clauses 2-15.

Clause 16. Method for operating an electrical device, the method comprising:
- providing from one of the electrical power inputs of the electrical device, a first electrical power input where electrical power is available;
- routing electrical power from the first electrical power input to at least one electrical power output of the electrical device;
  - detecting a first depletion signal indicative of an interruption in the electrical power at the first electrical power input;
  - selecting a second electrical power input of the electrical device where electrical power is available;
  - switching from the first electrical power input to the second electrical power input in response to the first depletion signal, thereby routing electrical power from the second electrical input to the at least one of the electrical power outputs.

Clause 16a. Method for operating a portable electrical device, the method comprising:
- providing, at a first electrical input of the electrical device, a separable connection to a first power source;
- providing, at a second electrical input of the electrical device, a separable connection to a second power source;
- routing, in a first mode, electrical power which is available at the first electrical power input to one or more electrical power outputs of the electrical device; and preventing power from the second electrical input from being delivered to the electrical power outputs,
- detecting a first depletion signal indicative of an interruption in the electrical power at the first electrical power input;
- selecting the second electrical power input of the electrical device where electrical power is available;
- switching, in response to the first depletion signal, from the first mode to a second mode in which electrical power from the second electrical input is routed to the at least one of the electrical power outputs, and power from the first electrical power input is prevented from being delivered to the electrical power outputs.

Clause 17. Method according to clause 16 or clause 16a, further comprising:
- detecting a first power present signal indicative of availability of electrical power at the first electrical power input;
- switching back from the second electrical power input to the first electrical power input in response to the first power present signal, thereby routing electrical power from the first electrical input to the at least one of the electrical power outputs.

Clause 18. Method according to clause 16 or 16a, further comprising:
- detecting a first power present signal indicative of availability of electrical power at the first input;
- continuing to provide electrical power from the second electrical input to the at least one of the electrical power outputs until a second depletion signal is detected; the second depletion signal being indicative of an interruption in the electrical power at the second electrical input,
- switching from the second electrical power input to the first electrical power input in response to the second depletion signal, thereby routing electrical power from the first electrical input to the at least one of the electrical power outputs.

Clause 19. Method according to any of the above method claims, comprising:
- preventing electrical power from the first electrical input from being routed to at least one electrical power output of the electrical device;
- detecting a first depletion signal indicative of an interruption in electrical power at the first electrical power input;
- selecting a second electrical power input of the electrical device where electrical power is available;
- providing electrical power from the second electrical power input to the at least one of the electrical power outputs (where electrical power from the first electrical input was prevented from being routed).

Clause 20. A method for operating an electrical device, the method comprising:
- preventing electrical power from at least one of the electrical power inputs of the electrical device from being routed to at least one electrical power output of the electrical device;
- detecting a first depletion signal indicative of an interruption in electrical power at a first electrical power input (e.g., primary input) of the electrical device;
- selecting a second electrical power input of the electrical device where electrical power is available;

providing electrical power from the second electrical power input to at least one of the electrical power outputs.

Clause 20a. A method of operating a portable electrical device, the method comprising:

providing, at a first electrical input of the electrical device, a separable connection to a first power source;

providing, at a second electrical input of the electrical device, a separable connection to a second power source (e.g., the second power source being different from the first power source);

preventing, in a third mode, electrical power which is available at the first electrical power input from being available at one or more electrical power outputs of the electrical device; each electrical power output being (e.g., separatably) connectable to supply electrical power to an individual electrical power consumer, detecting a first depletion signal indicative of an interruption in the electrical power at the first electrical power input;

selecting the second electrical power input of the electrical device where electrical power is available;

switching, in response to the first depletion signal, from the third mode to a fourth mode in which electrical power from the second electrical input is routed to (e.g., provided to, or made available at) the at least one of the electrical power outputs. (It shall be appreciated that in the fourth mode the first electrical power input may be isolated from the electrical power outputs.)

Clause 21. A system (e.g., an electrical device) comprising means for performing the steps of any of the above method clauses.

Clause 22: A software product comprising instructions which when executed by a suitable electrical device (e.g., via a controller) causes the device to perform the steps of any of the above method clauses.

The invention claimed is:

1. A portable electrical device, comprising:

a housing;

a first electrical power input operable to receive electrical power from a first power source, the first electrical power input being separatably connectable to the first power source via a first input electrical socket disposed on the housing;

a second electrical power input operable to receive electrical power from a second power source, the second electrical power input being separatably connectable to the second power source via a second input electrical socket disposed on the housing;

a plurality of electrical power outputs, each electrical power output being operable to supply electrical power to an electrical load that is separatably connectable to the respective electrical power output via an output electrical socket disposed on the housing;

a switching circuit contained within the housing comprising a plurality of switching components, each switching component being connected respectively to one of the electrical power inputs, the switching circuit operable in a first mode to connect power conductors originating from the first electrical power input to at least one of the plurality of electrical power outputs, wherein in the first mode, power from the second power source is prevented from being delivered to any of the plurality of electrical power outputs;

a sense circuit operable to detect a depletion signal indicating an interruption in the electrical power which is being provided at the first electrical power input; and a controller operable to control the switching circuit, in a second mode, to switch from the first electrical power input to the second electrical power input in response to the depletion signal, thereby connecting power conductors originating from the second electrical power input to the at least one of the plurality of electrical power outputs.

2. The portable electrical device of claim 1, wherein, the sense circuit is further operable to detect a power present signal at each of the electrical power inputs indicating availability of a power source at that specific input.

3. The portable electrical device of claim 2, wherein the first electrical power input is a primary input such that the controller is operable to control the switching circuit from the second mode to the first mode to switch back to the primary input in response to the power present signal of the first electrical power input.

4. The portable electrical device of claim 1, wherein the first power source is a mains grid power.

5. The portable electrical device of claim 1, wherein at least one of the first power source and the second power source is external to the housing, and wherein the at least one of the first power source and the second power source that is external to the housing is an energy unit having its own energy storage reserve.

6. The portable electrical device of claim 5, wherein the depletion signal is indicative of a predetermined limit of energy remaining in the energy storage reserve of the energy unit.

7. The portable electrical device of claim 1, wherein the depletion signal involves a change in a physical parameter at the first electrical power input.

8. The portable electrical device of claim 5, wherein the depletion signal involves a change in a physical parameter at the energy unit which is powering at least one of the electrical power outputs.

9. The portable electrical device of claim 1, wherein the controller is further operable to prevent the switching circuit from switching from the second electrical power input to the first electrical power input until a second depletion signal occurs, the second depletion signal being indicative of an interruption in the electrical power which is being provided at the second electrical power input, the sense circuit being operable to detect the second depletion signal at the second electrical power input.

10. The portable electrical device of claim 2, wherein the power present signal for any of the respective electrical power inputs involves sensing a physical parameter at that electrical power input.

11. The portable electrical device of claim 1, wherein the depletion signal for any of the respective electrical power inputs is provided via a communication link operatively coupled to the corresponding power source connected at the respective electrical power input.

12. The portable electrical device of claim 2, wherein the power present signal for any of the respective electrical power inputs is provided via a communication link operatively coupled to the corresponding power source connected at the respective electrical power input.

13. The portable electrical device of claim 1, wherein the controller is operable to control the switching circuit in a break-before-make or a make-before-break fashion when switching to a different electrical power input.

14. The portable electrical device of claim 1, wherein each of the input and output electrical sockets is configured to accept at least one of an AC power plug and a DC power plug.

15. The portable electrical device of claim 1, wherein the housing is sealed from exposure to dust and moisture.

16. The portable electrical device of claim 1, wherein the plurality of switching components comprise a plurality of relays that are each connected respectively to one of the electrical power inputs.

17. The portable electrical device of claim 1, wherein the plurality of switching components comprise one or more switches, wherein each switch is configured to connect one of the power conductors to a respective one of the electrical power outputs.

18. A method for operating a portable electrical device, the method comprising:

providing a first power source to a first electrical power input of the electrical device, wherein the first power source is separatably connected to the first electrical power input via a first input electrical socket disposed on a housing of the electrical device;

providing a second power source to a second electrical power input of the electrical device, wherein the second power source is separatably connected to the second electrical power input via a second input electrical socket disposed on the housing of the electrical device;

providing an electrical load to a first of a plurality of electrical power outputs of the electrical device, wherein the electrical load is separatably connected to the electrical power output via a first of a plurality of output electrical sockets disposed on the housing of the electrical device;

operating a switching circuit in a first mode, the switching circuit comprising a plurality of switching components, each switching component being connected respectively to one of the electrical power inputs, wherein, in the first mode, electrical power which is available at the first electrical power input is routed to the electrical load by connecting power conductors originating from the first electrical power input to the first electrical power output and the first output electrical socket and additionally preventing power from the second electrical power input from being delivered to any of the plurality of electrical power outputs;

detecting a first depletion signal indicative of an interruption in the electrical power at the first electrical power input;

selecting the second electrical power input of the electrical device where electrical power is available; and switching, in response to the first depletion signal, the switching circuit from the first mode to a second mode in which electrical power from the second electrical power input is routed to the electrical load by connecting power conductors originating from the second electrical power input to the first electrical power output and power from the first electrical power input is prevented from being delivered to any of the electrical power outputs.

19. The method of claim 18, further comprising:

detecting a first power present signal indicative of availability of electrical power at the first electrical power input; and switching, in response to the first power present signal, from the second mode to the first mode, thereby routing electrical power from the first electrical power input to the first electrical power output.

20. The method of claim 19, further comprising:

detecting a first power present signal indicative of availability of electrical power at the first electrical power input;

continuing to provide electrical power from the second electrical power input to the first electrical power output until a second depletion signal is detected, the second depletion signal being indicative of an interruption in the electrical power at the second electrical power input; and switching from the second electrical power input to the first electrical power input in response to the second depletion signal, thereby routing electrical power from the first electrical power input to the first electrical power output.

21. The method of claim 18, wherein switching from the first mode to the second mode occurs in a break-before-make or a make-before-break fashion.

22. The method of claim 18, wherein providing the first power source to the first electrical power input comprises inserting at least one of an AC power plug and a DC power plug to the first input electrical socket.

* * * * *